(12) United States Patent
Lewis et al.

(10) Patent No.: US 10,358,089 B2
(45) Date of Patent: Jul. 23, 2019

(54) METHOD AND APPARATUS FOR TRIGGERING HITCH VIEW

(71) Applicant: GM GLOBAL TECHNOLOGY OPERATIONS LLC, Detroit, MI (US)

(72) Inventors: Allan Lewis, Windsor (CA); Mohammad Naserian, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 261 days.

(21) Appl. No.: 15/471,453

(22) Filed: Mar. 28, 2017

(65) Prior Publication Data

US 2018/0281679 A1 Oct. 4, 2018

(51) Int. Cl.
| | |
|---|---|
| *G06T 7/73* | (2017.01) |
| *B60R 1/00* | (2006.01) |
| *B60Q 1/00* | (2006.01) |
| *H04N 7/18* | (2006.01) |
| *H04N 5/247* | (2006.01) |
| *B62D 53/08* | (2006.01) |

(52) U.S. Cl.
CPC .............. *B60R 1/00* (2013.01); *B60Q 1/0023* (2013.01); *G06T 7/73* (2017.01); *H04N 5/247* (2013.01); *H04N 7/183* (2013.01); *B60K 2350/2013* (2013.01); *B60K 2350/352* (2013.01); *B60K 2370/21* (2019.05); *B60K 2370/52* (2019.05); *B60R 2300/301* (2013.01); *B60R 2300/808* (2013.01); *B62D 53/08* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 9,156,496 B2 | 10/2015 | Greenwood et al. | |
| 2017/0050567 A1* | 2/2017 | Bochenek | B60R 1/003 |
| 2017/0158007 A1* | 6/2017 | Lavoie | B60T 7/20 |
| 2018/0215382 A1* | 8/2018 | Gupta | G08G 1/165 |
| 2018/0251153 A1* | 9/2018 | Li | B62D 13/06 |

\* cited by examiner

*Primary Examiner* — Eileen M Adams

(57) ABSTRACT

A method and apparatus for triggering a hitch view are provided. The method includes: determining whether a hitch of a vehicle will be coupling with a trailer coupler of a trailer, in response to determining that the hitch of the vehicle will be coupling with the trailer coupler, detecting a position of the trailer coupler, and displaying a view of the trailer coupler corresponding to the detected position of the trailer coupler from among a plurality of views. The method may assist an operator of a vehicle in aligning the vehicle hitch with a trailer coupler.

18 Claims, 4 Drawing Sheets

METHOD AND APPARATUS FOR TRIGGERING HITCH VIEW

INTRODUCTION

Apparatuses and methods consistent with exemplary embodiments relate to detecting trailers and assisting operators that are coupling vehicle hitches to trailer couplers. More particularly, apparatuses and methods consistent with exemplary embodiments relate to providing a rear view video to assist a vehicle operator with trailer coupling.

SUMMARY

One or more exemplary embodiments provide a method and an apparatus that detect whether a vehicle will be coupling with a trailer and that display a video corresponding to the position of the trailer with respect to the vehicle. More particularly, one or more exemplary embodiments provide a method and an apparatus that detect a type of trailer, a position of the trailer, and that process and display a rear view video corresponding to the trailer type and the trailer position.

According to an aspect of an exemplary embodiment, a method for triggering a hitch view is provided. The method includes: determining whether a hitch of a vehicle will be coupling with a trailer coupler of a trailer, in response to determining that the hitch of the vehicle will be coupling with the trailer coupler, detecting a position of the trailer coupler, and displaying a view of the trailer coupler corresponding to the detected position of the trailer coupler from among a plurality of views.

The determining whether the hitch of the vehicle will be coupling with the trailer coupler may include determining whether the vehicle is in reverse, determining whether the vehicle is moving backwards, and detecting a trailer behind a vehicle or detecting that the vehicle is in a hitching mode.

The detecting the position of the trailer coupler may include identifying the trailer coupler in an image taken by a center high mount stop lamp (CHMSL) camera, identifying fixed points corresponding to edges of the vehicle in the image, and detecting the position of the trailer coupler based on estimated coordinates of the identified trailer coupler and pre-stored coordinates of the fixed points.

The position of the trailer coupler may be a zone from among a plurality of zones.

The method may further include detecting a type of the trailer and the displaying the view of the trailer coupler corresponding to the detected position of the trailer coupler from among a plurality of views may be performed based on the detected type of the trailer.

The detected type of trailer may be a trailer configured to mount to a standard hitch outside of a bed of the vehicle, the plurality of views may include two views, and the plurality of zones comprises two zones that respectively correspond to each of the two views. A first zone of the plurality of zones may correspond to a first area outside of the bed of the vehicle and a second zone of the plurality of zones may correspond to a second area in between the first area and the standard hitch outside of a bed of the vehicle.

The two views may include a first view corresponding to the first zone and that shows a default view of a center high mount stop lamp (CHMSL), and a second view corresponding to the second zone showing an enlarged image of the standard hitch outside of the bed of the vehicle.

The detected type of trailer may include a fifth wheel type trailer configured to mount to a hitch positioned in a bed of the vehicle, the plurality of views may include three views, and the plurality of zones ma include three zones that respectively correspond to the three views.

A first zone of the plurality of zones may correspond to a first area outside of the bed of the vehicle, a third zone of the plurality of zones may correspond to third area inside of the bed of the vehicle, and a second zone of the plurality of zones may correspond to a second area in between the first area and the third area.

The three views may include a first view corresponding to the first zone and that shows a default view of a center high mount stop lamp (CHMSL), a second view corresponding to the second zone showing a zoomed in image of the fifth wheel type trailer in the second area, and a third view corresponding to the third zone showing a zoomed in image of the third area inside the bed of the vehicle.

According to an aspect of an exemplary embodiment, an apparatus for triggering a hitch view is provided. The apparatus includes: at least one memory comprising computer executable instructions; and at least one processor configured to read and execute the computer executable instructions. The computer executable instructions may cause the at least one processor to determine whether a hitch of a vehicle will be coupling with a trailer coupler of a trailer, in response to determining that the hitch of the vehicle will be coupling with the trailer coupler, detect a position of the trailer coupler, and display a view of the trailer coupler corresponding to the detected position of the trailer coupler from among a plurality of views.

The computer executable instructions may cause the at least one processor to determine whether the hitch of the vehicle will be coupling with the trailer coupler by determining whether the vehicle is in reverse, determining whether the vehicle is moving backwards, and detecting a trailer behind a vehicle or detecting that the vehicle is in a hitching mode.

The computer executable instructions may cause the at least one processor to detect the position of the trailer coupler by identifying the trailer coupler in an image taken by a center high mount stop lamp (CHMSL) camera, identifying fixed points corresponding to edges of the vehicle in the image, and detecting the position of the trailer coupler based on estimated coordinates of the identified trailer coupler and pre-stored coordinates of the fixed points.

The position of the trailer coupler may include a zone from among a plurality of zones.

The computer executable instructions may further cause the at least one processor to detect a type of the trailer, and may cause the at least one processor to display the view of the trailer coupler corresponding to the detected position of the trailer coupler from among a plurality of views based on the detected type of the trailer.

The detected type of trailer may be a trailer configured to mount to a standard hitch outside of a bed of the vehicle, the plurality of views may include two views and the plurality of zones may include two zones that respectively correspond to each of the two views.

A first zone of the plurality of zones may correspond to a first area outside of the bed of the vehicle and a second zone of the plurality of zones corresponds to a second area in between the first area and the standard hitch outside of the bed of the vehicle. The two views may include a first view corresponding to the first zone and that shows a default view of a center high mount stop lamp (CHMSL), and a second view corresponding to the second zone and that shows an enlarged image of the standard hitch outside of the bed of the vehicle.

The detected type of trailer may be a fifth wheel type trailer configured to mount to a hitch positioned in a bed of the vehicle, the plurality of views may include three views and the plurality of zones may include three zones that respectively correspond to each of the three views.

A first zone of the plurality of zones may correspond to a first area outside of the bed of the vehicle, a third zone of the plurality of zones may correspond to third area inside of the bed of the vehicle, and a second zone of the plurality of zones may correspond to a second area in between the first area and the third area.

Three views may include a first view corresponding to the first zone and that shows a default view of a center high mount stop lamp (CHMSL), a second view corresponding to the second zone showing a zoomed in image of the fifth wheel type trailer in the second area, and a third view corresponding to the third zone showing a zoomed in image of the third area inside the bed of the vehicle.

Other objects, advantages and novel features of the exemplary embodiments will become more apparent from the following detailed description of exemplary embodiments and the accompanying drawings.

DETAILED DESCRIPTION OF EXEMPLARY EMBODIMENTS

Figure 1:
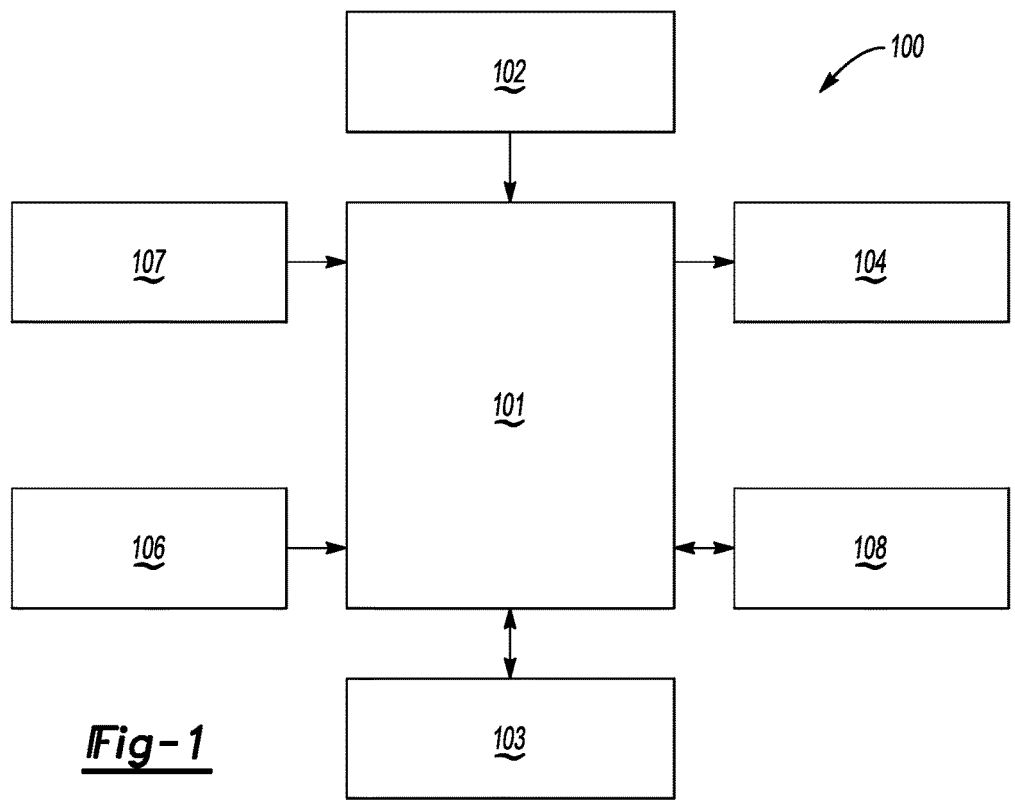
FIG. 1 shows a block diagram of an apparatus that triggers a hitch view according to an exemplary embodiment.

An apparatus and method for that trigger a hitch view will now be described in detail with reference to FIGS. 1-5 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or into one or more devices. In addition, individual elements may be provided on separate devices.

Vehicles such as trucks include trailer hitches that serve as attachment points for trailers that are towable by the vehicle. Some trailers that may be towed by a vehicle include a fifth-wheel type, a gooseneck type, or a standard low mount coupler trailer. To attach a trailer to vehicle, an operator must guide the vehicle so that a hitch located in the bed of the vehicle or located on the back of the vehicle aligns with the coupler of the trailer. Often times, the process of aligning the hitch of the vehicle with the trailer coupler requires repeatedly entering and exiting the vehicle, or the guidance of another person standing outside of the vehicle.

To address the above issue, operators of a vehicle may view an image provided by a rear view camera or a rear-facing camera. The image may be used by an operator to guide the vehicle. However, rear facing or rear view cameras that provide one image view that may not be useful when the hitch gets closer to the coupler of the trailer. Thus, providing multiple views from a rear view or rear facing camera and triggering the views at an appropriate time in the alignment process may be helpful to an operator of a vehicle.

FIG. 1 shows a block diagram of an apparatus that triggers a hitch view 100 according to an exemplary embodiment. As shown in FIG. 1, the apparatus that triggers a hitch view 100, according to an exemplary embodiment, includes a controller 101, a power supply 102, a storage 103, an output 104, a user input 106, a trailer detection sensor 107, and a communication device 108. However, the apparatus that triggers a hitch view 100 is not limited to the aforementioned configuration and may be configured to include additional elements and/or omit one or more of the aforementioned elements. The apparatus that triggers a hitch view 100 may be implemented as part of a vehicle, as a standalone component, as a hybrid between an on vehicle and off vehicle device, or in another computing device.

The controller 101 controls the overall operation and function of the apparatus that triggers a hitch view 100. The controller 101 may control one or more of a storage 103, an output 104, a user input 106, a trailer detection sensor 107, and a communication device 108 of the apparatus that triggers a hitch view 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the storage 103, the output 104, the user input 106, the trailer detection sensor 107, and the communication device 108 of the apparatus that triggers a hitch view 100. The information may be sent and received via a bus or network, or may be directly read or written to/from one or more of the storage 103, the output 104, the user input 106, the trailer detection sensor 107, and the communication device 108 of the apparatus that triggers a hitch view 100. Examples of suitable network connections include a controller area network (CAN), a media oriented system transfer (MOST), a local interconnection network (LIN), a local area network (LAN), wireless networks such as Bluetooth and 802.11, and other appropriate connections such as Ethernet.

The power supply 102 provides power to one or more of the controller 101, the storage 103, the output 104, the user input 106, the trailer detection sensor 107, and the communication device 108, of the apparatus that triggers a hitch view 100. The power supply 102 may include one or more from among a battery, an outlet, a capacitor, a solar energy cell, a generator, a wind energy device, an alternator, etc.

The storage 103 is configured for storing information and retrieving information used by the apparatus that triggers a hitch view 100. The storage 103 may be controlled by the controller 101 to store and retrieve information received from the trailer detection sensor 107. The information may include information on a trailer detected by the trailer detection sensor 107, image information of images taken by the trailer detection sensor 107, information on a position or zone where the trailer is located, information on a type of detected trailer, and/or information indicating whether a vehicle will be coupling with a trailer. The storage 103 may also include the computer instructions configured to be executed by a processor to perform the functions of the apparatus that triggers a hitch view 100.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the apparatus that triggers a hitch view 100. The output 104 may include one or more from among a speaker, an audio device, a display, a centrally-located display, a head up display, a windshield display, a haptic feedback device, a vibration device, a tactile feedback device, a tap-feedback device, a holographic display, an instrument light, an indicator light, etc.

The output 104 may output notification including one or more from among an audible notification, a light notification, and a display notification. The notification may indicate that the vehicle is in hitching mode or attempting to hitch with a trailer. In addition, the output 104 may output an image from the rear of a vehicle showing the bed of the vehicle and/or an area behind the vehicle including a trailer to which the vehicle is attempting to hitch. The image from the rear of the vehicle may be processed or be adjusted according to a zone where a trailer is located. For example, an image may be zoomed, magnified and/or cropped depending on the zone where the trailer is located.

In addition, the image may be taken from more than one trailer detection sensor 107 (e.g., a camera), each of the more than one trailer detection sensor 197 corresponding to a zone where a trailer may be located. For example, the image from a first camera such as a center high mount stop light camera may be displayed when a trailer is located in a first zone such as a zone located in a vehicle bed. In another example, another image from a second camera such as a trunk or gate-mounted camera may be displayed when the trailer is located in another zone such as a zone behind a vehicle.

The user input 106 is configured to provide information and commands to the apparatus that triggers a hitch view 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a touchpad, etc. The user input 106 may be configured to receive a user input to acknowledge or dismiss the notification output by the output 104. The user input 106 may also be configured to receive a user input to activate a trailer detection algorithm or activate a hitching mode of the apparatus that triggers a hitch view 100. The user input may 106 may also be configured to receive a user input to identify a hitch in the image received from a rear facing camera.

The trailer detection sensor 107 may include one or more from among a plurality of sensors including an imaging sensor, a camera, a laser sensor, an ultrasonic sensor, an infrared camera, a LIDAR, a radar sensor, an ultra-short range radar sensor, an ultra-wideband radar sensor, and a microwave sensor. The trailer detection sensor 107 may provide one or more images from one or more rear-facing cameras that may be analyzed to determine whether an operator of a vehicle intends to couple a hitch on a bed of the vehicle with a trailer, analyzed to identify a trailer and/or analyzed to identify a coupler of a trailer. In addition, other types of information such as distance, infrared images, speed, velocity, acceleration, direction of travel, etc., from other types of sensors may be provided. The information may be processed to determine whether an operator of a vehicle intends to couple a hitch on a bed of the vehicle with a trailer, determine a type of trailer, determine a position of a trailer, determine information about the movement of a vehicle such as velocity and/or trajectory, or determine whether a gate of a bed of a vehicle is open.

The communication device 108 may be used by the apparatus that triggers a hitch view 100 to communicate with various types of external apparatuses according to various communication methods. The communication device 108 may be used to send/receive information including information on a trailer detected by the trailer detection sensor 107, information on which a zone that the trailer where the trailer is located, information on a type of detected trailer, information from the trailer detection sensor 107 such as image information, information on vehicle dynamics such as vehicle velocity and vehicle trajectory, and/or information indicating whether a vehicle will be coupling with a trailer, to/from the controller 101 of the apparatus that triggers a hitch view 100.

The communication device 108 may include various communication modules such as one or more from among a telematics unit, a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long-term evolution (LTE), Bluetooth, EVDO, CDMA, GPRS, EDGE or ZigBee.

According to another exemplary embodiment, the controller 101 of the apparatus that triggers a hitch view 100 may be configured to determine whether a hitch of a vehicle will be coupling with a trailer coupler of a trailer, in response to determining that the hitch of the vehicle will be coupling with the trailer coupler, detect a position of the trailer coupler, and display a view of the trailer coupler corresponding to the detected position of the trailer coupler from among a plurality of views.

The controller 101 of the apparatus that triggers a hitch view 100 may be configured to determine whether the hitch of the vehicle will be coupling with the trailer coupler by determining whether the vehicle is in reverse, determining whether the vehicle is moving backwards, and detecting a trailer behind a vehicle or detecting that the vehicle is in a hitching mode.

The controller 101 of the apparatus that triggers a hitch view 100 may be configured to detect the position of the trailer coupler by identifying the trailer coupler in an image taken by a center high mount stop lamp (CHMSL) camera, identifying fixed points corresponding to edges of the vehicle in the image, and detecting the position of the trailer coupler based on estimated coordinates of the identified trailer coupler and pre-stored coordinates of the fixed points. The position of the trailer may be a zone from among a plurality of zones.

The controller 101 of the apparatus that triggers a hitch view 100 may be configured to detect a type of trailer. The type of trailer may be a gooseneck or fifth wheel type trailer or standard low mount hitch type trailer. The controller 101 may be configured to display the view of the trailer coupler corresponding to the detected position of the trailer coupler from among a plurality of views based on the detected type of the trailer. The number of zones may vary according to the type of trailer. For example, two zones may be set for a standard low mount hitch and three zones may be set for a goose neck or fifth wheel type trailer. However, the number of zones is not limited to the aforementioned zones and may vary depending on the specifications. Each of the plurality of zones should corresponds to a specific view created by adjusting and/or displaying an image from one or more rear view cameras or trailer detection sensors 107.

According to an example with two zones, the two zones may include a first zone of the plurality of zones that corresponds to first area outside of the bed of the vehicle and a second zone of the plurality of zones that corresponds to a second area in between the first area and the standard low mount hitch outside of the bed of the vehicle. Moreover, two views that correspond to the two zones may include a first view corresponding to the first zone and that shows a default view from a center high mount stop lamp (CHMSL), and a second view corresponding to the second zone and that shows an enlarged image of the standard low mount type hitch outside of the bed of the vehicle.

According to another example with three zones, the three zones may include a first zone of the plurality of zones that corresponds to first area outside of the bed of the vehicle, a third zone of the plurality of zones that corresponds to third area inside of the bed of the vehicle, and a second zone of the plurality of zones that corresponds to a second area in between the first area and the third area. Moreover, three views that correspond to the three zones may include a first view corresponding to the first zone and that shows a default view of a center high mount stop lamp (CHMSL), a second view corresponding to the second zone showing a zoomed in image of the fifth wheel type trailer in the second area, and a third view corresponding to the third zone showing a zoomed in image of the third area inside the bed of the vehicle.

The controller 101 may also be configured to perform the image analysis on the image received from the rear view camera by dewarping the image, applying a filter to the image and detecting edges in the image, identifying line targets in the image, identifying and edge of the trailer in the image and determining a distance between the edge of trailer and vehicle bed plane.

Figure 2:
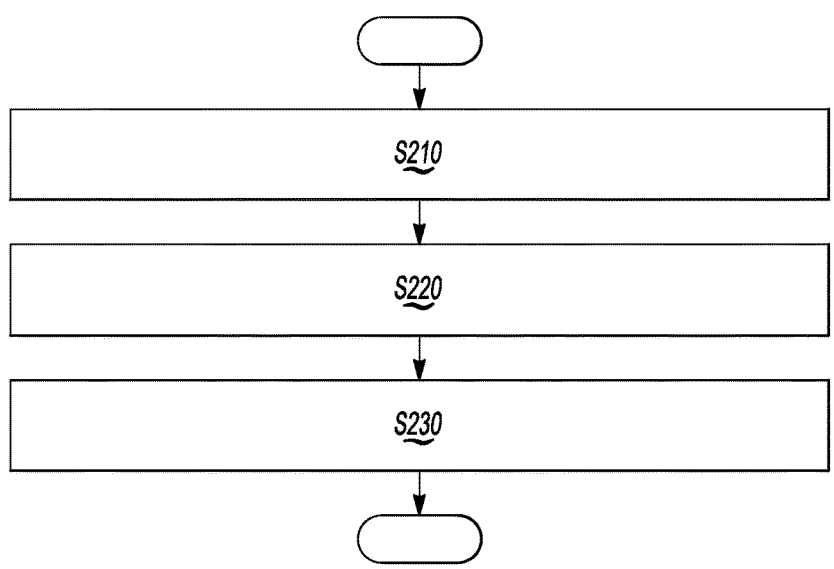
FIG. 2 shows a flowchart for a method of triggering a hitch view according to an exemplary embodiment.

FIG. 2 shows a flowchart for a method for triggering a hitch view according to an exemplary embodiment. The method of FIG. 2 may be performed by the apparatus that triggers a hitch view 100 or may be encoded into a computer readable medium as instructions that are executable by a computer to perform the method.

Referring to FIG. 2, determining whether a vehicle hitch will be coupling with a trailer coupler is performed in operation S210. The position of the trailer coupler is detected in operation S220. In operation S230, a view from among a plurality of views of the trailer and/or trailer coupler is selected and displayed based on the detected position of the trailer coupler.

Figure 3A:
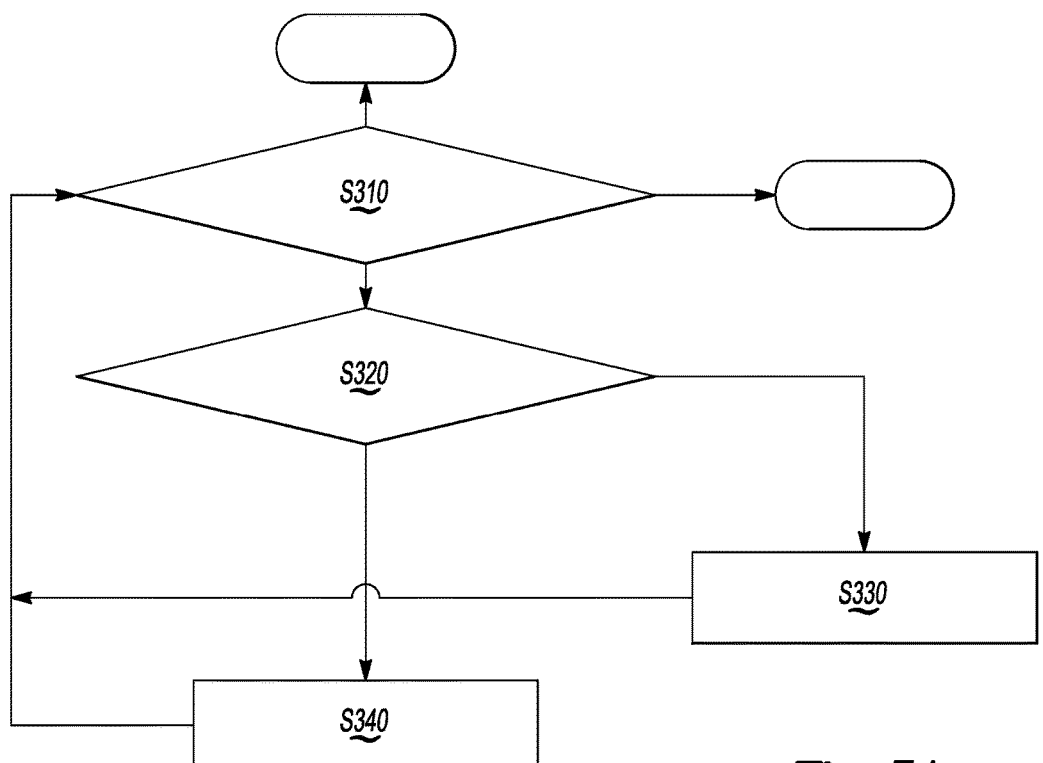
FIGS. 3A and 3B show a flowchart for a method of triggering a hitch view and an illustration of zones corresponding to the hitch views of FIG. 3A, respectively, according to an aspect of an exemplary embodiment.
Figure 3B:
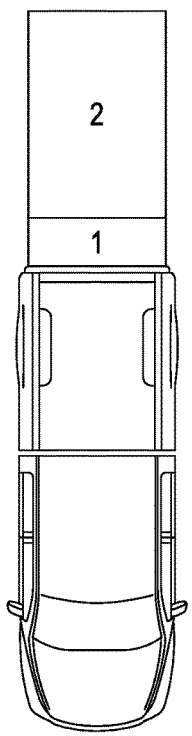

FIGS. 3A and 3B show a flowchart for a method of triggering a hitch view and an illustration of zones corresponding to hitch views, respectively, according to an aspect of an exemplary embodiment. The method of FIG. 3A may be performed by the apparatus that triggers a hitch view 100 or may be encoded into a computer readable medium as instructions that are executable by a computer to perform the method.

The method of FIG. 3A may be performed after detecting that a vehicle is attempting to hitch with a standard or low mount type trailer coupler. In particular, FIG. 3A shows a method performed when an area behind a vehicle hitch is divided into two zones.

Referring to FIG. 3A, determining whether a vehicle is in reverse and hitching is active is performed in operation S310. If it is determined that the vehicle is in reverse or moving backward and hitching mode is active (operation S310—Yes), the method moves to operation S320. Otherwise, the method ends (operation S310—No).

In operation S320, a position of a coupler of trailer is determined based on an image from a rear view camera. In this case, a standard low mount type trailer coupler is detected. If the position of the coupler is determined to be in Zone 1 (operation S320—Zone 1), an image from a rear view camera showing a first view of the coupler in zone 1 is displayed to an operator of vehicle. According to an example, a close up image of the coupler of the trailer and hitch of the vehicle may be shown when the coupler is in Zone 1 in operation S340. The method may then return to operation S310 to determine whether a vehicle is in reverse and hitching is active.

If this position of the coupler of the trailer is determined to be in Zone 2 and outside of Zone 1 (operation S320—Zone 2 and Not Zone 1), an image of a second view or default view of the rear view camera may be displayed to the operator of the vehicle in operation S330. The method may then return to operation S310 to determine whether a vehicle is in reverse and hitching mode is active.

Referring to FIG. 3B, Zone 1 may be an area outside of a bed of a vehicle or an area extending from the rear of the vehicle. Zone 1 may extend between the rear of the vehicle to a second zone, i.e., Zone 2. Zone 2 may be an area that extends from the end of Zone 1 to a predetermined distance away from the vehicle.

Figure 4A:
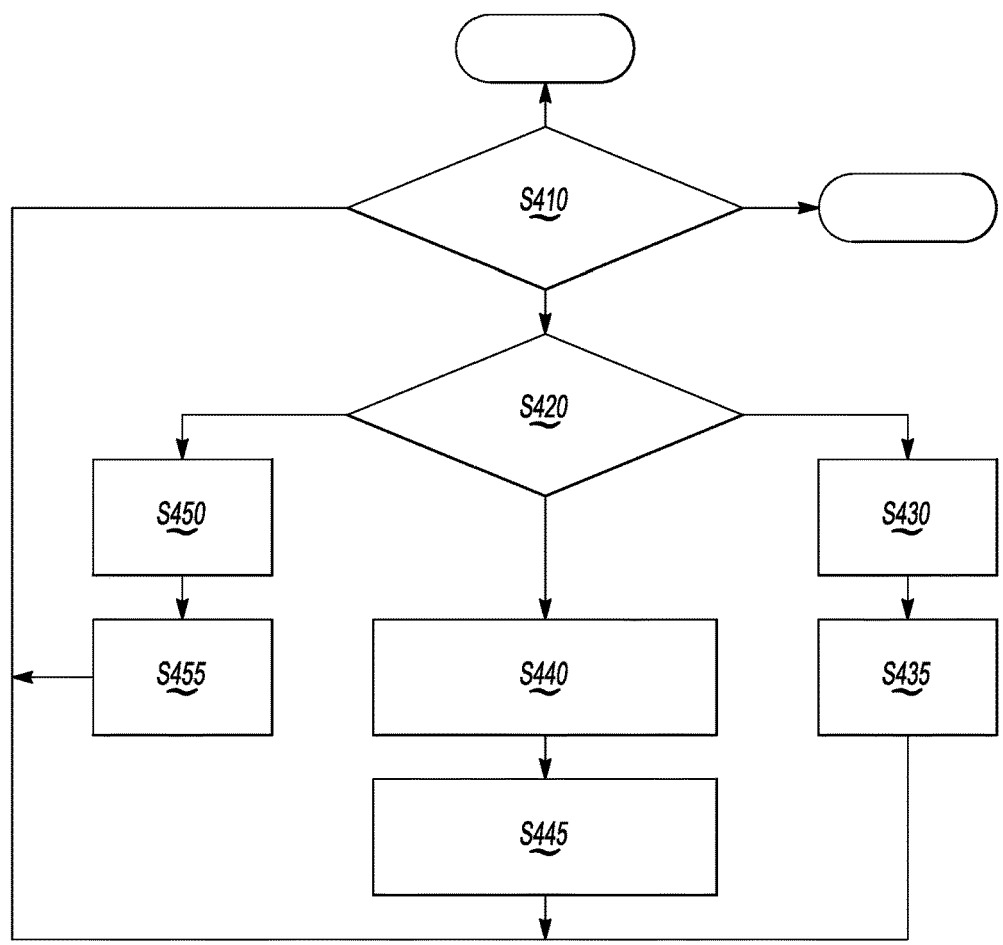
FIGS. 4A and 4B show a flowchart for a method of triggering a hitch view and an illustration of zones corresponding to the hitch views of FIG. 3B, respectively, according to an aspect of an exemplary embodiment.
Figure 4B:
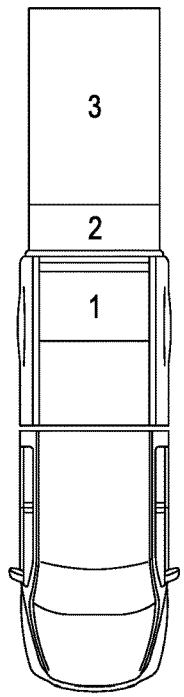

FIGS. 4A and 4B show a flowchart for a method of triggering a hitch view and an illustration of zones corresponding to hitch views, respectively, according to an aspect of an exemplary embodiment. The method of FIG. 4A may be performed by the apparatus that triggers a hitch view 100 or may be encoded into a computer readable medium as instructions that are executable by a computer to perform the method.

The method of FIG. 4A may be performed after detecting that a vehicle is attempting to hitch with a fifth wheel or gooseneck type trailer. In particular, FIG. 4A shows a method performed when an area behind a vehicle hitch is divided into three zones.

Referring to FIG. 4A, determining whether a vehicle is in reverse and hitching is active is performed in operation S410. If it is determined that the vehicle is in reverse or moving backward and hitching mode is active (operation S410—Yes), the method moves to operation S420. Otherwise, the method ends (operation S410—No).

In operation S420, a position of a coupler of trailer is determined based on an image from a rear view camera. In this case, a fifth wheel or gooseneck type trailer coupler is detected. If the position of the coupler is determined to be in Zone 3, but not in Zone 1 and not in Zone 2 (operation S440), an image from a rear view camera showing a first view or default view of the coupler is displayed to an operator of a vehicle (operation S445). According to an example, the first view or default view may show Zone 1, Zone 2 and Zone 3. The method may then return to operation 410 to determine whether a vehicle is in reverse and hitching mode is active.

If the position of the coupler is determined to be in Zone 2, but not in Zone 1 (operation S450), an image from a rear view camera showing a zoomed or magnified image of Zone 2 is displayed to an operation of a vehicle (operation S455). The method may then return to operation 410 to determine whether a vehicle is in reverse and hitching is active.

Moreover, if the position of the coupler is determined to be in Zone 1 (operation S430), a close up image of Zone 1 or an image of the coupler of the trailer and hitch of the vehicle may be displayed to the operator of the vehicle in operation S435. The method may then return to operation 510 to determine whether a vehicle is in reverse and hitching is active.

Referring to FIG. 4B, Zone 1 may be an area inside of a bed of a vehicle. Zone 2 may be an area outside of a bed of a vehicle or an area extending from the rear of the vehicle or the end of Zone 1 to Zone 3. In other words, Zone 2 may be the area between Zone 1 and Zone 3. In addition, Zone 3 may be an area that extends from the end of Zone 2 to a predetermined distance away from the vehicle.

Figure 5:
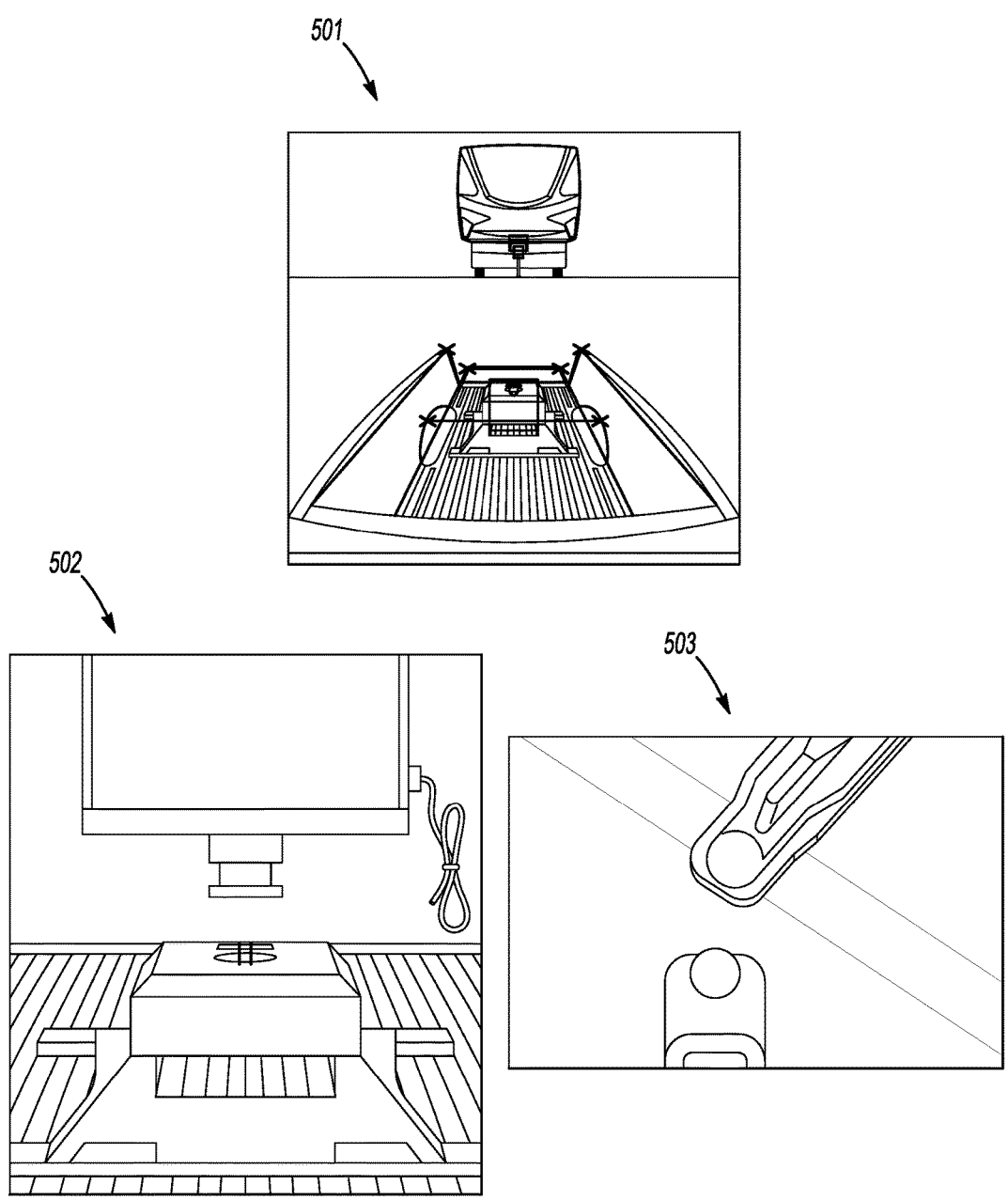
FIG. 5 shows illustrations of various hitch views according to an aspect of an exemplary embodiment.

FIG. 5 shows illustrations of various hitch views according to an aspect of an exemplary embodiment. Referring to FIG. 5, image 501 shows an example of default view displayed to an operator when a trailer is predetermined distance away from the trailer. The trailer may be recognized and the position of the trailer may be determined from the image 501 by recognizing the edges of the trailer and the edges of the vehicle bed and determining the distance between the edges. For example, the distance between edges or a coupler of the trailer and edges of a vehicle may be determined by detecting a distance between pixels in image and converting that distance to a real world distance. The real world distance may then be used to determine the position of the trailer.

Image 502 shows an enlarged, magnified or zoomed image of a fifth wheel type or gooseneck type trailer coupler. The fifth wheel type or gooseneck type trailer coupler in image 502 is located in a zone inside of a bed of a vehicle, which triggers the enlarged, magnified or zoomed image of the vehicle hitch being displayed to the operator of the vehicle.

Image 503 shows an enlarged, magnified or zoomed image of a standard or low mount trailer coupler and vehicle hitch. The standard or low mount trailer coupler and vehicle hitch is located in a zone just behind a vehicle and outside of the bed of the vehicle, which triggers the enlarged, magnified or zoomed image being displayed to the operator of the vehicle.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method for triggering a hitch view, the method comprising:
   determining whether a hitch of a vehicle will be coupling with a trailer coupler of a trailer;
   in response to determining that the hitch of the vehicle will be coupling with the trailer coupler, detecting a position of the trailer coupler and detecting a type of the trailer; and
   displaying a view of the trailer coupler corresponding to the detected position of the trailer coupler from among a plurality of views,
   wherein the displaying the view of the trailer coupler corresponding to the detected position of the trailer coupler from among a plurality of views is performed based on the detected type of the trailer.

2. The method of claim 1, wherein the determining whether the hitch of the vehicle will be coupling with the trailer coupler comprises determining whether the vehicle is in reverse, determining whether the vehicle is moving backwards, and detecting a trailer behind a vehicle or detecting that the vehicle is in a hitching mode.

3. The method of claim 1, wherein the detecting the position of the trailer coupler comprises identifying the trailer coupler in an image taken by a center high mount stop lamp (CHMSL) camera, identifying fixed points corresponding to edges of the vehicle in the image, and detecting the position of the trailer coupler based on estimated coordinates of the identified trailer coupler and pre-stored coordinates of the fixed points.

4. The method of claim 3, wherein the position of the trailer coupler comprises a zone from among a plurality of zones.

5. The method of claim 4, wherein the detected type of trailer comprises a trailer configured to mount to a standard hitch outside of a bed of the vehicle, and
wherein the plurality of views comprises two views and the plurality of zones comprises two zones that respectively correspond to each of the two views.

6. The method of claim 5, wherein a first zone of the plurality of zones corresponds to a first area outside of the bed of the vehicle and a second zone of the plurality of zones corresponds to a second area in between the first area and the standard hitch outside of a bed of the vehicle,
wherein the two views comprise a first view corresponding to the first zone and that shows a default view of a center high mount stop lamp (CHMSL), and a second view corresponding to the second zone showing an enlarged image of the standard hitch outside of the bed of the vehicle.

7. The method of claim 4, wherein the detected type of trailer comprises a fifth wheel type trailer configured to mount to a hitch positioned in a bed of the vehicle, and
wherein the plurality of views comprises three views and the plurality of zones comprises three zones that respectively correspond to the three views.

8. The method of claim 7, wherein a first zone of the plurality of zones corresponds to a first area outside of the bed of the vehicle, a third zone of the plurality of zones corresponds to third area inside of the bed of the vehicle, and a second zone of the plurality of zones corresponds to a second area in between the first area and the third area.

9. The method of claim 8, wherein the three views comprise a first view corresponding to the first zone and that shows a default view of a center high mount stop lamp (CHMSL), a second view corresponding to the second zone showing a zoomed in image of the fifth wheel type trailer in the second area, and a third view corresponding to the third zone showing a zoomed in image of the third area inside the bed of the vehicle.

10. An apparatus for triggering a hitch view, the apparatus comprising:
at least one memory comprising computer executable instructions; and
at least one processor comprising circuitry configured to read and execute the computer executable instructions, the computer executable instructions causing the at least one processor to:
determine whether a hitch of a vehicle will be coupling with a trailer coupler of a trailer;
in response to determining that the hitch of the vehicle will be coupling with the trailer coupler, detect a position of the trailer coupler and detect a type of the trailer; and
display a view of the trailer coupler corresponding to the detected position of the trailer coupler and the detected type of the trailer from among a plurality of views.

11. The apparatus of claim 10, wherein the computer executable instructions cause the at least one processor to determine whether the hitch of the vehicle will be coupling with the trailer coupler by determining whether the vehicle is in reverse, determining whether the vehicle is moving backwards, and detecting a trailer behind a vehicle or detecting that the vehicle is in a hitching mode.

12. The apparatus of claim 10, wherein the computer executable instructions cause the at least one processor to detect the position of the trailer coupler by identifying the trailer coupler in an image taken by a center high mount stop lamp (CHMSL) camera, identifying fixed points corresponding to edges of the vehicle in the image, and detecting the position of the trailer coupler based on estimated coordinates of the identified trailer coupler and pre-stored coordinates of the fixed points.

13. The apparatus of claim 12, wherein the position of the trailer coupler comprises a zone from among a plurality of zones.

14. The apparatus of claim 13, wherein the detected type of trailer comprises a trailer configured to mount to a standard hitch outside of a bed of the vehicle, and
wherein the plurality of views comprises two views and the plurality of zones comprises two zones that respectively correspond to each of the two views.

15. The apparatus of claim 14, wherein a first zone of the plurality of zones corresponds to a first area outside of the bed of the vehicle and a second zone of the plurality of zones corresponds to a second area in between the first area and the standard hitch outside of the bed of the vehicle, and
wherein the two views comprise a first view corresponding to the first zone and that shows a default view of a center high mount stop lamp (CHMSL), and a second view corresponding to the second zone and that shows an enlarged image of the standard hitch outside of the bed of the vehicle.

16. The apparatus of claim 13, wherein the detected type of trailer comprises a fifth wheel type trailer configured to mount to a hitch positioned in a bed of the vehicle, and
wherein the plurality of views comprises three views and the plurality of zones comprises three zones that respectively correspond to each of the three views.

17. The apparatus of claim 16, wherein a first zone of the plurality of zones corresponds to a first area outside of the bed of the vehicle, a third zone of the plurality of zones corresponds to third area inside of the bed of the vehicle, and a second zone of the plurality of zones corresponds to a second area in between the first area and the third area.

18. The apparatus of claim 17, wherein three views comprise a first view corresponding to the first zone and that shows a default view of a center high mount stop lamp (CHMSL), a second view corresponding to the second zone showing a zoomed in image of the fifth wheel type trailer in the second area, and a third view corresponding to the third zone showing a zoomed in image of the third area inside the bed of the vehicle.

* * * * *